US006709872B1

(12) United States Patent
Downs et al.

(10) Patent No.: US 6,709,872 B1
(45) Date of Patent: Mar. 23, 2004

(54) METHOD AND APPARATUS FOR DISPENSING LOW NANOLITER VOLUMES OF LIQUID WHILE MINIMIZING WASTE

(75) Inventors: Robert C. Downs, La Jolla, CA (US); Mark R. Weselak, San Diego, CA (US)

(73) Assignee: IRM LLC, Hamilton (BM)

( * ) Notice: Subject to any disclaimer, the term of this patent is extended or adjusted under 35 U.S.C. 154(b) by 0 days.

(21) Appl. No.: 09/562,652

(22) Filed: May 2, 2000

(51) Int. Cl.[7] .............................. G01N 1/10; B01L 3/02

(52) U.S. Cl. .................... 436/180; 422/100; 73/863.32; 73/864; 73/864.11; 73/864.16; 73/864.13

(58) Field of Search ......................... 422/100; 436/180; 73/863.31, 863.32, 864, 864.01, 864.02, 864.11, 864.13, 864.16, 864.17, 864.24, 864.25; 222/109

(56) References Cited

U.S. PATENT DOCUMENTS 3,641,823 A * 2/1972 Harris et al.
3,991,616 A * 11/1976 Stahli
4,036,064 A * 7/1977 Hydo
4,058,370 A * 11/1977 Suovaniemi
4,106,911 A * 8/1978 Marcelli
4,158,035 A * 6/1979 Haase et al.
4,277,440 A * 7/1981 Jessop et al.
4,340,390 A * 7/1982 Collins et al.
4,346,742 A * 8/1982 Chase et al.
4,399,711 A * 8/1983 Klein
4,452,899 A * 6/1984 Alston
4,457,184 A * 7/1984 Shiono
4,574,850 A * 3/1986 Davis
4,927,765 A * 5/1990 Saxon et al.
4,967,606 A * 11/1990 Wells et al.
5,013,529 A * 5/1991 Itoh
5,312,233 A 5/1994 Tanny
5,312,757 A * 5/1994 Matsuyama et al.
5,383,372 A * 1/1995 Qureshi et al.
5,452,619 A * 9/1995 Kawanabe et al.
5,741,554 A 4/1998 Tisone
5,763,278 A 6/1998 Sickinger
5,785,926 A * 7/1998 Seubert et al. .............. 422/100
5,811,306 A * 9/1998 Komatsu
5,906,947 A * 5/1999 Bienhaus et al.
5,916,524 A 6/1999 Tisone
5,927,547 A * 7/1999 Papen et al. .................. 222/57
6,063,339 A * 5/2000 Tisone et al. ................. 422/67
6,203,759 B1 * 3/2001 Pelc et al.
6,232,129 B1 * 5/2001 Wiktor
6,267,927 B1 * 7/2001 Pomar Longedo et al.
6,296,811 B1 * 10/2001 Sasaki ......................... 422/100
6,372,185 B1 * 4/2002 Shumate et al. ............ 422/100
6,431,015 B1 * 8/2002 Hodac et al. ............ 73/864.01
6,472,218 B1 * 10/2002 Stylli et al. .................... 436/48
6,521,187 B1 * 2/2003 Papen ......................... 422/100
6,537,505 B1 * 3/2003 LaBudde et al. ........... 422/103
6,589,791 B1 * 7/2003 LaBudde et al. ............. 436/55
6,592,825 B2 * 7/2003 Pelc et al. .................. 422/100
2001/0036425 A1 * 11/2001 Gazeau et al.
2002/0001544 A1 * 1/2002 Hess et al.

* cited by examiner

*Primary Examiner*—Maureen M. Wallenhorst
*Assistant Examiner*—Brian R. Gordon
(74) *Attorney, Agent, or Firm*—Timothy L. Smith; Hugh Wang; Mitchell P. Brook

(57) ABSTRACT

There is provided a method and apparatus for aspirating a volume of liquid into a syringe from a sample of the liquid. A substantial portion of the liquid in the syringe is subsequently dispensed from the syringe and returned to the sample. Accordingly, a small portion of the aspirated liquid is retained in the syringe. One or more nanoliter volumes of the liquid retained in the syringe are then dispensed from the syringe to a container for further use or analysis. It will be understood, therefore, that the volume of the originally aspirated liquid is substantially larger than the volume of liquid dispensed for further use or analysis. The invention also includes a method and apparatus for aspirating and dispensing a plurality of liquids by using a plurality of syringes, and also can be used to dispense liquids onto microplates.

31 Claims, 5 Drawing Sheets

METHOD AND APPARATUS FOR DISPENSING LOW NANOLITER VOLUMES OF LIQUID WHILE MINIMIZING WASTE

FIELD OF THE INVENTION

The present invention relates generally to a method and an apparatus for dispensing low nanoliter volumes of a liquid while minimizing waste. More specifically, the present invention relates to a method for providing small, accurate liquid transfers. Such liquid transfers are useful, for example, in biomedical and biotechnology processes such as a high throughput screening process.

BACKGROUND OF THE INVENTION

Industries, such as biotechnology and biomedical, use automated laboratory systems for producing and testing large numbers of chemical samples. These automated processes often require the manipulation of liquid samples, especially low volume liquid samples.

Current automated systems for high throughput screening can test over 100,000 samples a day. Many of the liquids used in these automated systems are expensive or available only in limited quantities. Therefore, current automated systems use small volumes of liquid to reduce costs and conserve liquid. However, when manipulating a small volume of liquid, the accuracy and precision of liquid transfers is critical to the reliability and reproducibility of the tests. Small errors or inaccuracies in dispensing a liquid can lead to test failure or the reporting of wrong results. Therefore, the need for accuracy and repeatability can restrict the ability of current systems to use very small volumes in screening. Further, current systems also often waste a substantial portion of the liquid before and after dispensing a small volume for use in the screening test. It is also important to minimize the volume of liquid solvents used, such as dimethyl sulfoxide (DMSO), as the solvent may affect the results of the testing.

Manual laboratory techniques for dispensing a small volume of a liquid are well known. For example, a laboratory technician may use a pipette to aspirate a quantity of a liquid, move the pipette to a sample well, and dispense a quantity of a liquid. However, the manual pipette operation is not capable of accurately dispensing volumes less than about several microliters. Such volumes are not only unacceptably large for automated processing, but the process of loading an entire sample plate is much too slow. Further, such a manual technique wastes a substantial quantity of liquid.

Current techniques also exist for automatically dispensing a limited number of samples in small volumes. However, the known techniques do not provide sufficient accuracy to dispense in the low nanoliter range or waste an unacceptable quantity of liquid. One such technique for dispensing nanoliter volumes requires aspirating a small quantity of a liquid into a syringe or pipette and then dispensing most or all of the aspirated liquid. However, due to the mechanical and structural limitations in operating the syringe or pipette, there results an unacceptably large variation in the actual amount of liquid aspirated. For example, many syringing systems suffer from mechanical backlash. Mechanical backlash results from the normal play between parts in a mechanical system. Accordingly, the mechanical components of the syringe system have one relationship during aspirating, but take on another relationship during dispensing. Even small variations in this mechanical relationship can significantly affect the quantity of liquid aspirated and dispense.

Syringe systems also suffer from variations in measurements depending on whether the syringe is aspirating or dispensing. For example, when aspirating, the syringe creates a low-pressure chamber for drawing in the liquid. The liquid may contain dissolved gases or small bubbles. Further, the low pressure chamber tends to distort the shape of chamber seals. However, when the syringe is dispensing, the dissolved gasses and seals are compressed. Accordingly, the syringe can aspirate a measured quantity of a liquid, but actually dispense a different quantity due to variations in liquid density and seal compression.

Also, after aspirating a liquid into a syringe, the tip of the syringe may retain a droplet. The size of the droplet on the tip will become significant in measuring the volume of liquid dispensed into a sample well as smaller volumes are dispensed.

Due to the limitations described above, current dispensing systems may not be able to accurately dispense in the low nanoliter volume range. For example, it may be desired to aspirate 50 nanoliters of a liquid. However, it would not be unusual, because of the structural and systematic limitations, that the actual quantity of liquid aspirated be anywhere in the range of 20 to 100 nanoliters. Since the quantity of liquid cannot be accurately aspirated, it follows that the amount dispensed is likewise inaccurate. Such large inaccuracies are unacceptable for proper test replication and reliability.

In an attempt to accommodate the structural and systematic problems described above, an alternate automated method of dispensing small volumes has been developed. Examples of systems and methods for dispensing liquids in small quantities are disclosed in U.S. Pat. Nos. 5,312,233; 5,763,278; 5,741,554; 5,785,926; 5,916,524; and 5,927,547.

In some alternate automated dispensing method, a relatively large volume of a liquid is aspirated into a syringe, the syringe primed, and then multiple small volumes dispensed. For example, 5,000 nanoliters (5 microliters) of a liquid can be aspirated into a syringe or pipette, a quantity of the liquid dispensed to prime the syringe, and then multiple low volume quantities dispensed until the syringe or pipette is empty. Accordingly, some of the operational and systematic inaccuracies are generally reduced by priming and by some spreading inaccuracies over multiple dispenses. In such a manner, each of the multiple volumes is somewhat more accurately dispensed then if a single dispense is made. However, this system suffers from wasting the liquid used to prime the syringe system. For example, if the process or screen needs only a single or a few dispenses in the low nanoliter volume range, then this conventional method of dispensing small volumes wastes large amounts of the liquid. Further, the low volume dispensers may still have unacceptably larger systematic inaccuracies.

Accordingly, there is a need for a method and an apparatus that can dispense low nanoliter volumes of liquids accurately and precisely while minimizing waste.

SUMMARY OF THE INVENTION

It is therefore an object of the present invention to provide an apparatus and method for accurately dispensing nanoliter volumes of a liquid. It is a separate object of the present invention to minimize waste of a dispensed liquid. The present invention alleviates to a great extent the disadvantages of the known methods and apparatus, for dispensing nanoliter volumes of liquids. Accordingly, the present invention improves the accuracy and precision in the dispensing of a low nanoliter volume of liquid, and minimizes wasted liquid.

Briefly, the present invention provides a method and apparatus for aspirating a volume of liquid into a syringe from a sample of the liquid. A substantial portion of the liquid in the syringe is subsequently dispensed from the syringe and returned to the sample. Accordingly, a small portion of the aspirated liquid is retained in the syringe. One or more low nanoliter volumes of the liquid retained in the syringe is then dispensed from the syringe to a container for further use or analysis. It will be understood, therefore, that the volume of the originally aspirated liquid is substantially larger than the volume of liquid dispensed for further use or analysis. The invention also includes a method and apparatus for aspirating and dispensing a plurality of liquids by using a plurality of syringes, and also can be used to dispense nanoliter volumes of liquids into microplates.

The method and apparatus for dispensing low nanoliter volumes involves accurately dispensing one or more samples with minimal waste. The method also substantially reduces systematic error introduced by mechanical backlash, for example. Further, waste is substantially reduced as compared to known methods.

These and other features and advantages of the present invention will be appreciated from review of the following detailed description of the invention, along with the accompanying figures in which like reference numerals refer to like parts throughout.

DETAILED DESCRIPTION OF THE INVENTION

A exemplary method for dispensing low nanoliter volumes of liquid is shown in FIGS. 1*a*–1*d*. As used herein, a low nanoliter volume is a volume from 1–500 nanoliters, preferably 1–100 nanoliters, and more preferably 1–50 nanoliters. However, it will be appreciated that the inventive aspects of this method can be applied to dispense other volumes.

Figures 1A, 1B, 1C, 1D:
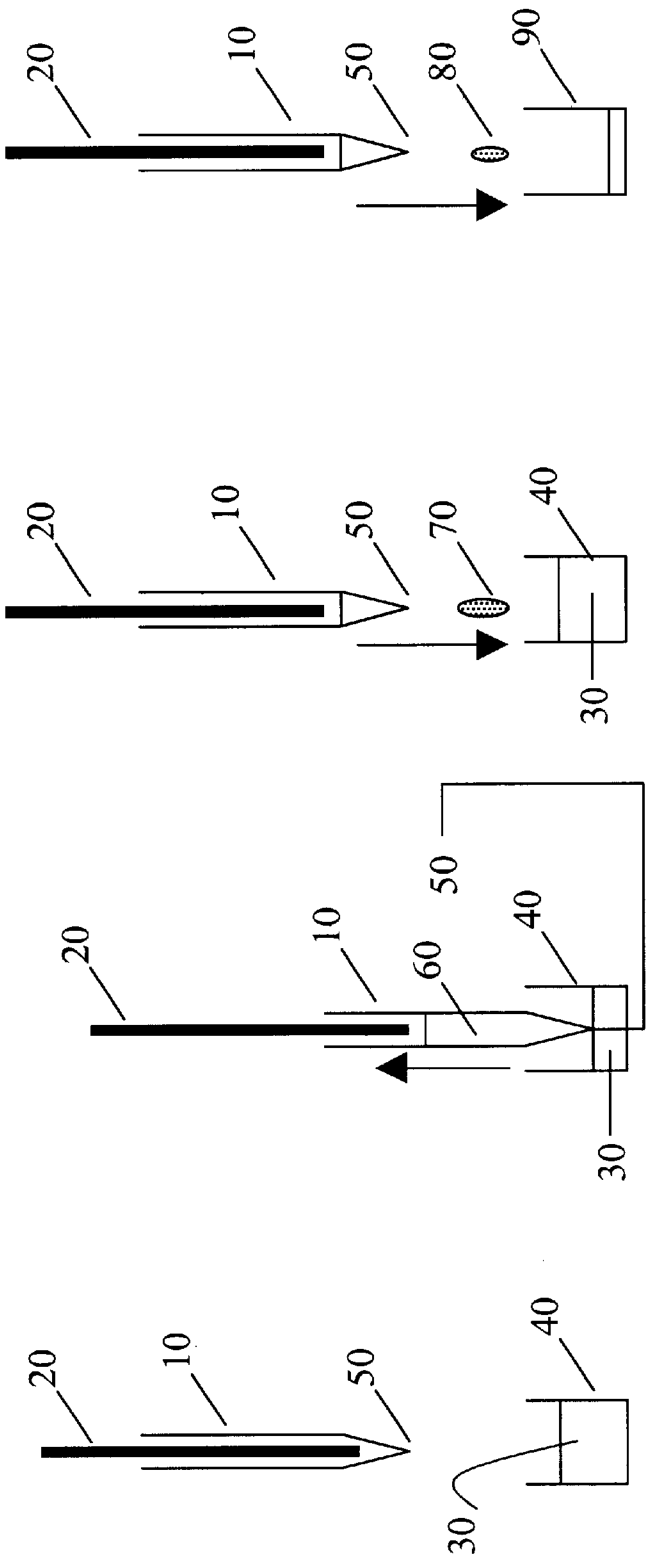
FIGS. 1*a*–1*d* are schematic views illustrating the dispensing of a low nanoliter volume of liquid according to the method of the present invention.

FIG. 1*a* shows an empty syringe 10 positioned over a sample of a liquid 30. While a syringe is shown in FIG. 1, a pipette, capillary, or other receptacle having an internal aperture for holding a liquid may be used. The sample of a liquid 30 can be kept in any type of container that is suitable for holding a reservoir of the liquid, such as, without limitation, a well in a microplate or a test tube. A piston 20 is shown inside the syringe 10.

The method for dispensing low nanoliter volumes of a liquid shown in FIG. 1 generally comprises three steps. First, a comparatively large volume of a liquid is aspirated into a syringe. Second, a substantial portion of the aspirated liquid is returned to the sample container. Third, one or more nanoliter volumes of the liquid are dispensed for further use. Each of the steps is described in more detail below.

FIG. 1*b* schematically illustrates the aspirating step. In this step, the piston 20 is withdrawn upward while the tip of the syringe 50 is immersed in the liquid 30 causing a first volume 60 of the liquid to be drawn into the syringe 10. This syringe-type mechanism works by positive displacement and is preferred because of its convenience and commercial availability. Examples of syringe-type devices for aspirating and dispensing are the Hydra™ and Ultra Hydra® microdispensers (Robbins Scientific Corp., Sunnyvale, Calif.). It will be appreciated that a wide variety of pumps may be used for aspirating the liquid into the syringe, including, without limitation, rotary pumps, peristaltic pumps, swash-plate pumps and the like. In the present invention, 1,000–10,000 nanoliters (i.e., 1–10 microliters) of the liquid are aspirated into the syringe 10, preferably 5,000–10,000 nanoliters, and more preferably 5,000–6,000 nanoliters. It will be appreciated that other volumes can be aspirated according to specific application requirements.

FIG. 1*c* schematically shows the returning step. In this step, the piston 20 is moved downward expelling a second volume 70 of the liquid from the syringe 10 back into the container 40. The second volume 70 is less than the first volume 60, such that a small amount of liquid remains in the syringe 10. Preferably, the second volume 70 is at least 80% of the first volume 60 so that at least 80% of the liquid 30 is returned to the container 40, thus minimizing waste. Such a substantial return also reduces the inaccuracies due to mechanical backlash and other systematic inaccuracies. More preferably the second volume 70 is at least 90% of the first volume 60. Most preferably, the second volume 70 is at least 95% of the first volume 60. It will be appreciated that the percentage of liquid returned can be adjusted to meet specific application requirements. For example, the returned liquid for the disclosed example can be in the range of 50% to over 99% of the quantity of aspirated liquid.

FIG. 1*d* schematically shows the dispensing step. In this step, the piston 20 is again moved downward dispensing a third volume 80 into a container 90. The container 90 can be any type of container that is suitable for holding a reservoir of the liquid, such as, without limitation, a well in a microplate or a test tube. The third volume 80 is less than the amount remaining in the syringe 10 after the second volume 70 is returned. Additional nanoliter volumes dispenses may then be sequentially performed. Any liquid sample remaining in the syringe 10 is discarded when the syringe is washed.

Figure 2B:
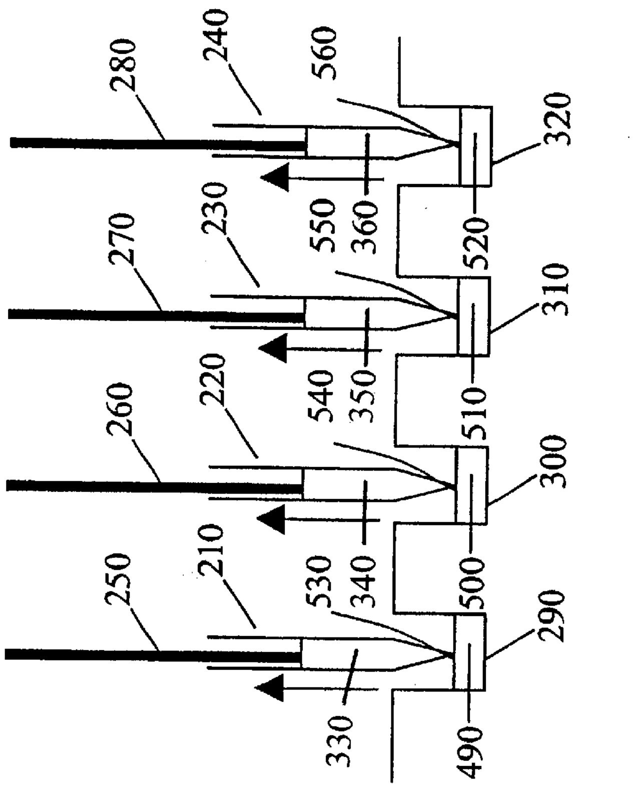
FIGS. 2*a*–2*d* are schematic cross-sectional views illustrating the dispensing of low nanoliter volumes of a plurality of liquids according to the method of the present invention.
Figure 2A:
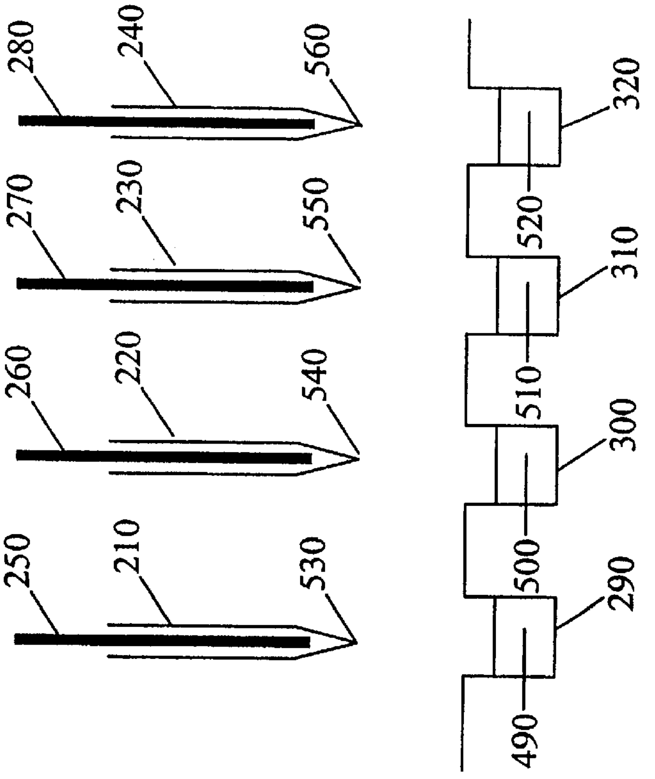

In another example, a method for parallel dispensing of low nanoliter volumes of a plurality of liquids into a microplate is shown in FIGS. 2*a*–2*d*. FIG. 2*a* shows a plurality of syringes 210–240 positioned over a number of wells of a microplate 290–320 each containing a sample of a different liquid 490–520. Preferably the number of syringes used in this method is 96 or 384. The microplates used in this method preferably have 96, 384, or 1536 wells. Pistons 250–280 are shown within syringes 210–240 respectively.

FIG. 2*b* schematically shows the aspirating step. Pistons 250–280 are withdrawn upward while the tips of the syringes 530–560 are immersed in the liquids 490–520 causing a first volume 330–360 of the liquids to be drawn into the syringes 210–240. In the present invention, 1,000–10,000 nanoliters of the liquids are aspirated into the syringes 210–240, preferably 5,000–10,000 nanoliters, and more preferably 5,000–6,000 nanoliters. It will be appreciated that other volumes can be aspirated.

Figure 2D:
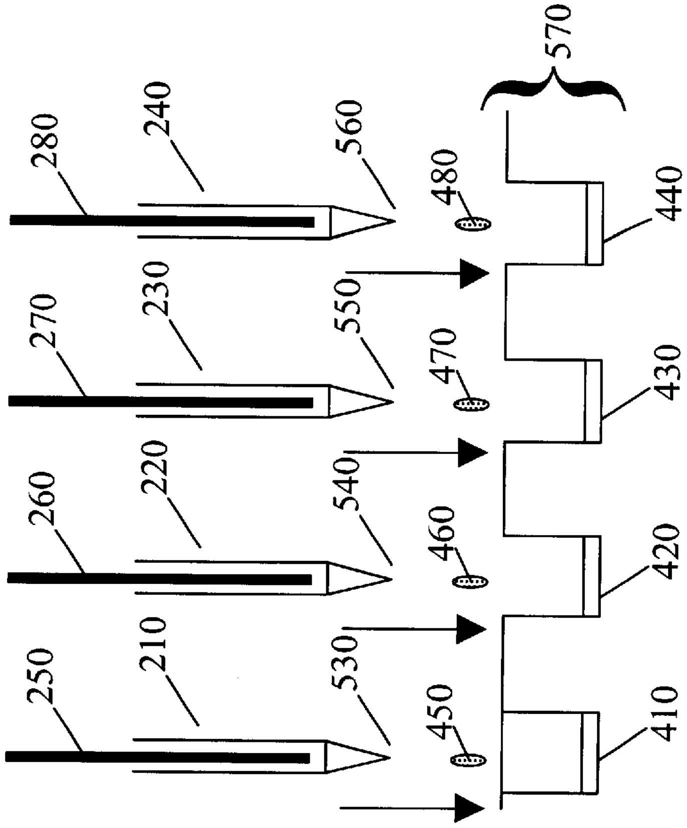
Figure 2C:
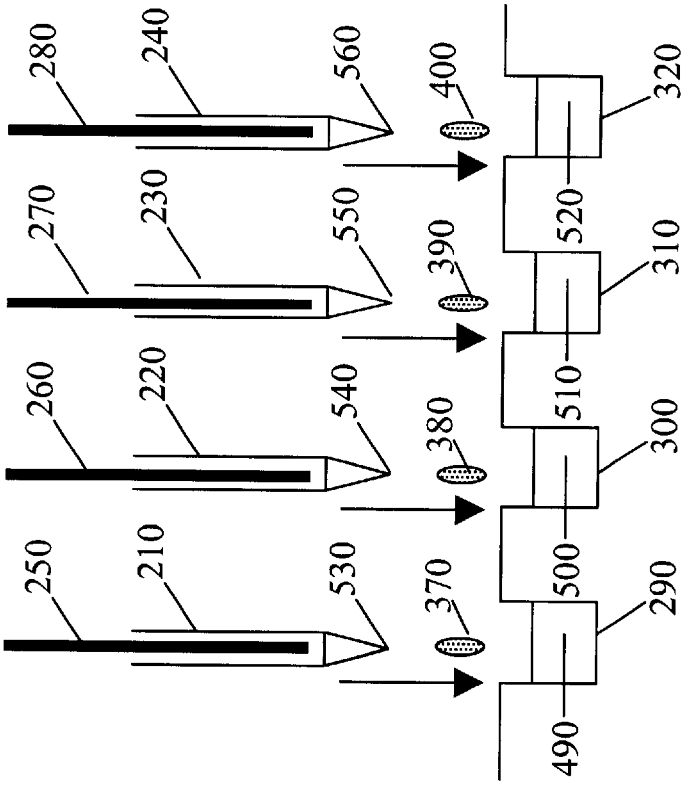

FIG. 2*c* schematically shows the returning step. In this step, the pistons 250–280 are moved downward expelling a second volume 370–400 of the liquids from the syringes 210–240 back into the well of the microplate that held the samples of each of the liquids 490–520. The second volume 370–400 is less than the first volume 330–360, such that some amount of liquid remains in the syringes 210–240. The second volume 370–400 is at least 80% of the first volume 330–360 so that at least 80% of each of the liquids are returned to the well 290–320 holding the samples 490–520 thus minimizing waste. As above, such a substantial return from each syringe improves dispensing accuracy. Preferably the second volume is at least 90% of the first volume. More preferably, the second volume is at least 95% of the first volume. It will be appreciated that other percentage of liquid may be returned according to specific application requirements, for example, 50% to 99%.

FIG. 2*d* schematically shows the dispensing step. In this step, the pistons 250–280 are again moved downward dispensing a third volume 450–480 into wells of a first microplate 570. The first microplate has preferably 96, 384, or 1536 wells. The third volume 450–480 is less than the amount remaining in the syringe 210–240 after the second volume 370–400 is returned.

The present invention can also be used to dispense the same low nanoliter volume of a liquid to different containers ("replica plating") or to dispense different low nanoliter amounts of a liquid to different containers ("serial dilutions"). For replica plating, the above described method is modified to include a fourth, fifth, and sixth volume. The fourth, fifth, and sixth volume are each equal to the third volume, and are dispensed into a second, third, and fourth container respectively.

In an example of a serial dilution, a fourth volume is dispensed into a second container; a fifth volume is dispensed into a third container; and a sixth volume is dispensed into a fourth container. It will be appreciated that a different number of containers and dispenses may be used. Preferably, the third volume is in the range of about 50–250 nanoliters, the fourth volume is in the range of about 25–125 nanoliters, the fifth volume is in the range of about 10–75 nanoliters, and the sixth volume is in the range of about 5–25 nanoliters. It will be understood that different volumes can be used depending on the dilution desired. Further, it will be appreciated that each of the serially dispensed volumes may be the same, larger, or smaller than the previous dispensed volume. Accordingly, a dilution solution may be formed in nearly any proportion.

Figure 3:
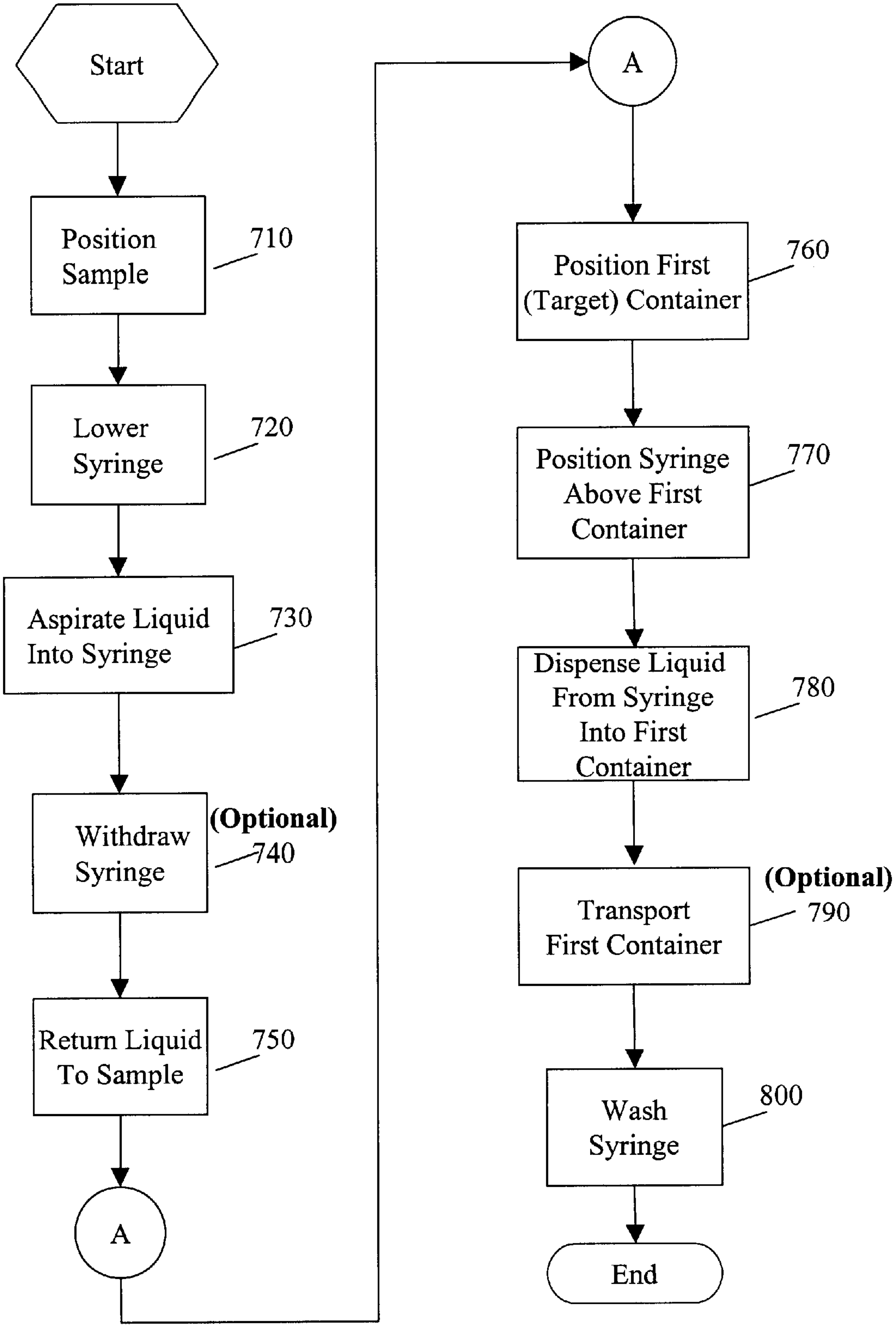
FIG. 3 is a flow chart showing the steps of the method of the present invention.

FIG. 3 shows a flow chart of a method in accordance with the present invention. In block 710, a liquid sample is positioned under a syringe. An example of a liquid is a chemical dissolved in a liquid solution of DMSO, but may also be, for example, a liquid aqueous solution. It will be appreciated that a wide variety of liquids can be utilized. The sample can be held in any type of a receptacle that is suitable for holding a reservoir of the liquid, such as, without limitation, a well in a microplate or a test tube. It is desirable that the liquid does not have any particulate material that may interfere with later aspirating and dispensing steps. It is also desirable that the liquid sample not contain air bubbles, which may reduce the accuracy or precision in the dispensing of the liquid. The sample may be positioned manually by an operator or automatically by a robot.

In block 720 the syringe is lowered into the sample liquid. A pipette, capillary, or other receptacle having an internal aperture that can hold a liquid may be used. The syringe is lowered into the liquid sample to a sufficient depth such that at least a volume of liquid (e.g., at least 5,000 nanoliters) to be aspirated (i.e., the first volume) is above the tip of the syringe without toughing the bottom of the liquid sample receptacle. The act of lowering the syringe can be performed manually or robotically.

The liquid of the sample is aspirated into the syringe as shown in block 730. Preferably, the aspiration occurs by the operation of a positive displacement pump. A moveable piston within the syringe provides the positive displacement. Many other pumps may be used in this step including, without limitation, rotary pumps, peristaltic pumps, swash-plate pumps and the like. In the present invention, 1,000–10,000 nanoliters of the liquid are aspirated into the syringe, preferably 5,000–10,000 nanoliters, and more preferably 5,000–6,000 nanoliters. It will be appreciate that other volumes can be used.

Optionally, the syringe is then withdrawn from the sample of liquid as described in block 740. While it is not necessary to perform this step, it may improve the accuracy and precision of the dispensing of the liquid. This step may be performed manually or robotically.

A second volume of the liquid is returned from the syringe to the sample as shown in block 750; The second volume is at least 80%, preferably at least 90%, and most preferably at least 95% of the first volume 60 so that as much of the liquid as possible is returned to the sample thus minimizing waste while maintaining the accuracy and precision of the dispensing. It will be understood that other percentage of liquid may be returned consistent with the disclosed method. This step, like the aspirating step, occurs preferably by the action of a positive displacement pump or may occur by, without limitation, rotary pumps, peristaltic pumps, swash-plate pumps and the like.

A container is positioned under the syringe as shown in block 760. The first container can be any type of container that is suitable for holding a reservoir of the liquid, such as, without limitation, a well in a microplate or a test tube. The container is preferably a well in a 384-well microplate or a 1536-well microplate. This step may be performed manually or robotically. Then the syringe, which contains the liquid, is positioned over the container 770. This step may also be performed manually or robotically.

A third volume of the liquid is dispensed into the first container in block 780. The third volume is less than the amount remaining in the syringe after the second volume is returned to the sample. Preferably, the third volume is in a range of about 1–250 nanoliters, but other volumes may be substituted. This step, like the aspirating and returning steps, occurs preferably by the action of a positive displacement pump or may occur by, without limitation, rotary pumps, peristaltic pumps, swash-plate pumps and the like.

The liquid is typically dispensed from a tip of a syringe into the first container. In one example the tip may be positioned above a liquid level in the first container during the dispensing operation. In another example, the tip may be in the liquid in the first container during the dispensing operation. Also, after dispensing liquid, the tip may retain a small droplet of liquid. Depending on the specific application, the quantity of liquid remaining on the tip may need to be accounted for. Accordingly, the tip may be drawn against a sidewall of the container where the droplet substantially passes to the sidewall due to a reduction in surface tension. Such a procedure is commonly referred to as a "dry-touchoff". It will be appreciated that the drop may be removed by a dry touch-off procedure on another surface. Alternatively, a wet touch-off may be used where the tip is drawn to a liquid surface, such as the liquid surface in the first container. In such a manner, a droplet on the tip substantially passes into the container liquid due to a reduction in surface tension on the droplet.

Optionally, the container is transported away from the area of dispensing as shown in block 790. The container may be transported, for example, to a testing area, a storage area, or an area for the dispensing of another liquid. This optional transporting step may be performed manually or robotically.

The syringe, containing a residual amount of the liquid, is washed in block 800. A minimal amount of liquid, preferably in a range of about 25–100 nanoliters is wasted in this step. It will be appreciated that more or less liquid may be wasted. This step may occur, for example, by the repeated aspiration and dispensing of a volume of a solution (e.g., chlorine bleach) for cleaning the syringe.

Figure 4:
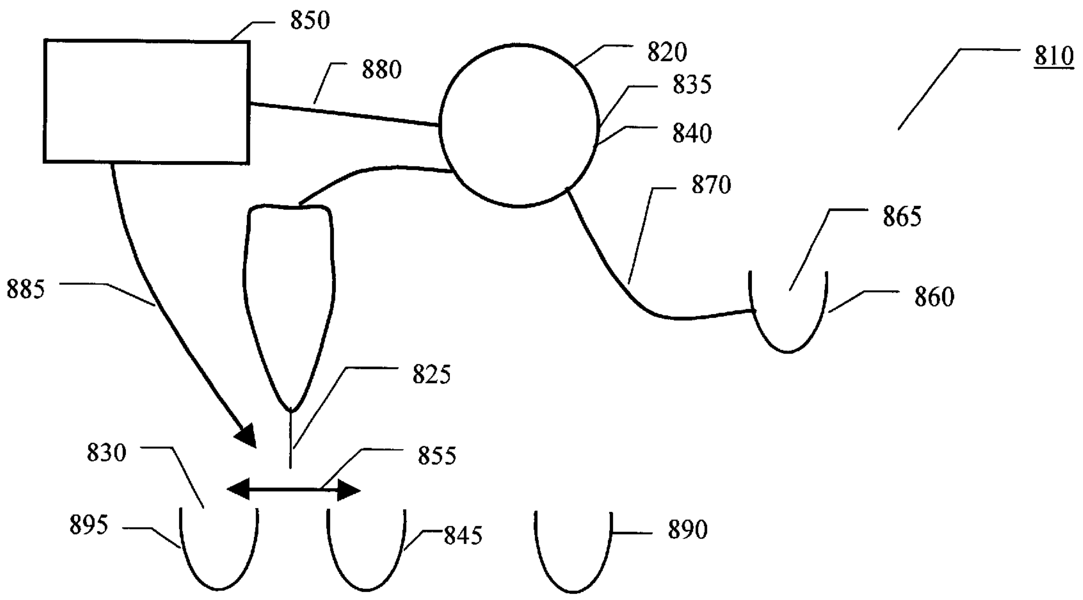
FIG. 4 is a schematic view of a dispensing apparatus for use in accordance with the method of the present invention.

The present invention also provides an apparatus 810 for dispensing a low nanoliter volume of a liquid accurately and precisely while minimizing waste, as shown schematically in FIG. 4. The apparatus 810 has aspirating means 820 for aspirating a first volume of liquid into a syringe 825 from a sample 830 of the liquid retained in sample container 895; returning means 835 for returning a second volume of the liquid from the syringe 825 to the sample 830, wherein the second volume of the liquid is less than the first volume; and dispensing means 840 for dispensing a third volume of the liquid from the syringe 825 into a first container 845. The apparatus also has a cleaning solution 865 in container 860 for cleaning and purging sample liquid from the system. Wasted cleaning solution and sample liquid may be disposed in waste container 890, for example.

Each of the aspirating means, returning means, and dispensing means is preferably a positive displacement pump that can operate both to aspirate or dispense. Most preferably, the same pump operates under automatic control to operate to aspirate, return, and dispense. The same pump may also be used to facilitate cleaning the system and wasting liquid sample remaining after the dispensing cycle. It will be appreciated, however, that multiple pumps may be used. Further, a wide variety of other pumps that can both aspirate and dispense may be used as the aspirating means, returning means, and dispensing means, including, without limitation, rotary pumps, peristaltic pumps, swash-plate pumps and the like. The apparatus of the present invention may also have a plurality of syringes, preferably 96 or 384.

The apparatus 810 has a controller means 850 for directing the implemented process. The controller 850 connects to the aspirating, returning, and dispensing means via connection 880. Accordingly, the controller 850 generates commands for directing the process of aspirating, returning, and dispensing. The controller 850 also directs the relative position of the syringe 825 to the containers, such as sample container 845, sample well 845, and waste container 890. As shown by arrow 855, the syringe may be positioned directly over each of the identified containers. It will be appreciated that the controller directs positioning the syringe, which can be done by moving the syringe, moving the containers, or a combination of both. For example, the syringe may be robotically maneuvered to be positioned over each container. In the alternative, the containers may be moved robotically to be positioned under the syringe.

The following examples are intended to illustrate but not limit the present invention.

EXAMPLE 1

Dispensing a Low Nanoliter Volume of a Liquid

A syringe of approximately 10,000 nanoliter capacity attached to an Ultra Hydra® microdispenser was immersed in a well of a first microplate containing a sample of a liquid DMSO solution. The Ultra Hydra® was programmed to aspirate 5,000 nanoliters of the DMSO solution into the syringe and then return 4,900 nanoliters of the DMSO solution from the syringe to the sample in the well of the first microplate. The return step eliminated much of the inaccuracy due to mechanical backlash and other systematic errors. The syringe, now containing 100 nanoliters of the DMSO solution, was positioned over a well of a second microplate. The Ultra Hydra® then dispensed 50 nanoliters of the DMSO solution into the well of the second microplate. As described earlier, one or more dispenses are preferably made in the low nanoliter volume range, for example, 1–100 nanoliters. It will be appreciated that other low nanoliter volumes may be dispensed. In Example 1, a single dispense of 50 nanoliters is made, although multiple or other volumes are contemplated. The 50 nanoliters of DMSO solution remaining in the syringe were then washed out to prepare the syringe for dispensing a different liquid. Thus, only 50 nanoliters of sample was wasted.

EXAMPLE 2

Dispensing Serial Dilutions of a Plurality of Liquids Into Microplates

Each well of a 384-well microplate contained approximately 20,000 nanoliters of a sample of a different chemical dissolved in liquid DMSO. The microplate was positioned under an Ultra Hydra® microdispenser with 384 syringes. Each syringe of the Ultra Hydra® was immersed in the liquids that were in each of the 384 wells of the microplate. The Ultra Hydra® was programmed to aspirate 5,000 nanoliters of each of the liquids from the samples and then return 4,700 nanoliters of each liquid to the samples. The Ultra Hydra® was then programmed to dispense 100 nanoliters of each liquid into the wells of a first target 384-well microplate, 50 nanoliters of each liquid into the wells of a second target 384-well microplate, 25 nanoliters of each liquid into the wells of a third target 384-well microplate, and 10 nanoliters of each liquid into the wells of a fourth target 384-well microplate. The liquids remaining in the syringes are washed out to prepare the syringes for dispensing different liquids.

As shown in the above examples, the method and apparatus for low nanoliter volume dispensing provides one or more accurate nanoliter dispenses with minimal waste. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A method for dispensing low nanoliter volumes of a liquid, the method comprising:

aspirating at least one volume of liquid into at least one of one or more receptacles from at least one of one or more samples of the liquid;

returning a substantial portion of the volume of the aspirated liquid to the sample, the returned volume of the liquid being less than the aspirated volume so that a small volume of liquid is retained in the receptacle;

dispensing a low nanoliter portion of the retained volume of liquid into a first container, the volume of the aspirated liquid being at least several times the volume of dispensed liquid; and discarding any remaining volume of retained liquid.

2. The method for dispensing low nanoliter volumes of a liquid according to claim 1, wherein the receptacle is a syringe.

3. The method for dispensing low nanoliter volumes of a liquid according to claim 1, wherein the substantial portion returned to the sample is in the range of about 50% to about 99% of the volume of the aspirated liquid.

4. The method for dispensing low nanoliter volumes of a liquid according to claim 1, wherein the substantial portion returned to the sample is at least 80% of the volume of aspirated liquid.

5. The method for dispensing low nanoliter volumes of a liquid according to claim 1, wherein the substantial portion returned to the sample is about 90% of the volume of aspirated liquid.

6. The method for dispensing low nanoliter volumes of a liquid according to claim 1, wherein the substantial portion returned to the sample is about 95% of the volume of aspirated liquid.

7. The method for dispensing low nanoliter volumes of a liquid according to claim 1, wherein the volume of aspirated liquid is at least five times the volume of liquid dispensed.

8. The method for dispensing low nanoliter volumes of a liquid according to claim 1, wherein the volume of liquid dispensed is less than the amount remaining in the receptacle after the volume is returned.

9. The method of claim 1, wherein the aspirating step further includes aspirating a volume of one of a plurality of liquids into each of a plurality of syringes, the returning step includes returning a volume of the liquids from each of the plurality of syringes, and the dispensing step includes dispensing a volume of the liquids from each of the plurality of syringes.

10. The method of claim 9 wherein the plurality of syringes number 96 or 384.

11. The method of claim 1, wherein the aspirated volume of liquid is in the range of about 1000–10,000 nanoliters and the dispensed volume of liquid is in the range of about 1–200 nanoliters.

12. The method of claim 1 further comprising dispensing a volume of the retained liquid from the receptacle into a second container, wherein the volume of liquid dispensed into the second container volume is not more than the volume dispensed into the first container.

13. The method of claim 12, wherein the liquid dispensed into the second container is in the range of about 1–100 nanoliters volume.

14. The method of claim 12, further comprising dispensing a volume of the retained liquid from the receptacle into a third container, wherein the volume of liquid dispensed into the third container is not more than the volume of liquid dispensed into the second container.

15. The method of claim 14, wherein the volume of liquid dispensed into the third container is in the range of about 1–50 nanoliters.

16. The method of claim 14 further comprising dispensing another volume of the liquid from the receptacle into a fourth container, wherein the volume of liquid dispensed into the fourth container is not more than the volume of liquid dispensed into the third container.

17. The method of claim 16, wherein the volume dispensed into the fourth container is in the range of about 1–25 nanoliters.

18. The method of claim 1 wherein the aspirating, returning, and dispensing steps occur by positive displacement.

19. The method of claim 1 wherein only a single portion is dispensed before discarding the remaining volume of retained liquid.

20. The method according to claim 1, wherein several sequential dispenses are made before discarding the remaining volume of retained liquid.

21. The method according to claim 1 wherein the discarded remaining volume of retained liquid is less than about 50 nanoliters.

22. A method for dispensing low nanoliter volumes of a plurality of liquids into a plurality of microplates, each microplate having a plurality of sample wells, comprising:

aspirating a volume of each of a plurality of liquids from samples of the liquids into a plurality of syringes, each syringe being associated with one of the liquids;

returning a volume of each of the aspirated liquids from the plurality of syringes to the samples, wherein the returned volume is at least 80% of the aspirated volume, and a volume of each of the aspirated liquids is retained in each liquid's associated syringe;

dispensing a first low nanoliter volume of the retained liquid from each associated syringe into sample wells of a first microplate, wherein the dispensed first volume is not more than 10% of the aspirated volume; and dispensing a second low nanoliter volume of the retained liquid from each associated syringe into sample wells of a second microplate, wherein the dispensed second volume is not more than 10% of the aspirated volume.

23. The method of claim 22, wherein the plurality of microplates are 96-well plates.

24. The method of claim 22, wherein the plurality of micoplates are 384-well plates.

25. The method of claim 22, wherein the plurality of microplates are 1536-well plates.

26. The method of claim 22, wherein the aspirated volume is in the range of about 1,000–10,000 nanoliters, the returned volume is in the range of about 800–9,900 nanoliters, the first volume dispensed to the first microplate is in the range of about 50–250 nanoliters, and the second volume dispensed to the second microplate is in the range of about 25–125 nanoliters.

27. The method of claim 22, wherein the plurality of syringes numbers 96 or 384.

28. An apparatus for dispensing low nanoliter volumes of a liquid, the apparatus comprising one or more receptacles for aspirating and dispensing a liquid and a controller that directs the apparatus to:

aspirate a volume of liquid into a receptacle from a sample of the liquid;

return a substantial portion of the volume of the aspirated liquid to the sample, the returned volume of the liquid being less than the aspirated volume so that a volume of liquid is retained in the receptacle; and dispense a low nanoliter portion of the retained volume of liquid into a first container, the volume of the aspirated liquid being at least several times the volume of dispensed liquid.

29. The apparatus according to claim 28 wherein the receptacle is a syringe.

30. The apparatus of claim 29, wherein the apparatus comprises a plurality of syringes.

31. The apparatus of claim 30, wherein the plurality of syringes number 96 or 384.

* * * * *